United States Patent
Park (10) Patent No.: US 6,246,489 B1
(45) Date of Patent: Jun. 12, 2001

(54) METHOD OF AND APPARATUS FOR RECORDING A TELEPHONE CONVERSATION IN A CORDLESS FACSIMILE SYSTEM

(75) Inventor: Joo-Seung Park, Kyongsangbuk-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/099,392

(22) Filed: Jun. 18, 1998

(30) Foreign Application Priority Data

Jun. 19, 1997 (KR) .................................................. 97-25694

(51) Int. Cl.$^7$ ..................................................... B41B 1/49
(52) U.S. Cl. ........................................... 358/1.15; 358/442
(58) Field of Search .................................... 358/402, 406, 358/442, 468, 448, 479, 474, 478, 497, 1.15, 1.5; 382/313, 314, 317; 11/442

(56) References Cited

U.S. PATENT DOCUMENTS

| | | | |
|---|---|---|---|
| 4,788,714 | * | 11/1988 | Hashimoto ............................. 379/74 |
| 4,922,524 | * | 5/1990 | Baba et al. ........................... 374/100 |
| 4,962,526 | | 10/1990 | Kotani et al. ........................ 374/100 |
| 5,172,243 | | 12/1992 | Hayashi et al. ..................... 358/400 |
| 5,200,830 | * | 4/1993 | Imaizumi et al. ................... 358/296 |
| 5,200,991 | * | 4/1993 | Motoyanaga ........................ 358/422 |
| 5,255,312 | * | 10/1993 | Koshiishi ............................. 379/100 |
| 5,282,238 | * | 1/1994 | Berland ................................ 379/58 |
| 5,299,024 | * | 3/1994 | Kafri ................................... 358/400 |
| 5,402,251 | | 3/1995 | Ogasawara et al. ................ 358/473 |
| 5,426,511 | * | 6/1995 | Nagatomo ........................... 358/402 |
| 5,479,485 | * | 12/1995 | Hayashi ............................... 374/61 |
| 5,519,763 | * | 5/1996 | Nakemeyawa et al. ............. 379/61 |
| 5,555,100 | * | 9/1996 | Bloomfield et al. ................ 358/402 |
| 5,608,545 | * | 3/1997 | Kagawa ............................... 358/468 |
| 5,699,171 | * | 12/1997 | Minamizawa et al. .............. 358/440 |
| 5,748,337 | * | 5/1998 | Minamizawa ....................... 358/468 |
| 5,854,694 | * | 12/1998 | Payne et al. ........................ 358/473 |

* cited by examiner

Primary Examiner—Jerome Grant, II
(74) Attorney, Agent, or Firm—Robert E. Bushnell, Esq.

(57) ABSTRACT

A method of recording a telephone conversation in a cordless facsimile system including a cordless facsimile apparatus, a portable unit, and a base unit connected to a public switched telephone network, for wirelessly connecting the cordless facsimile apparatus to the portable unit. The portable unit wirelessly transfers a telephone conversation recording command to the wireless facsimile apparatus according to the telephone conversation recording command input by a user of the portable unit. Upon receiving the telephone conversation recording command, the cordless facsimile apparatus receives an RF signal corresponding to the telephone conversation, being transferred between the portable unit and the base unit, converts the received RF signal to voice data, and stores the voice data in a memory. Also, the portable unit can transfer a telephone conversation playback command to the cordless facsimile apparatus according to the telephone conversation playback command input by the user of the portable unit. Upon receiving the telephone conversation playback command, the cordless facsimile apparatus reads the voice data stored in the memory, converts the read voice data to the RF signal, and transfers the RF signal to the portable unit. Then, is the portable unit receives the RF signal transferred from the cordless facsimile apparatus and converts the received RF signal to the voice signal.

11 Claims, 7 Drawing Sheets

METHOD OF AND APPARATUS FOR RECORDING A TELEPHONE CONVERSATION IN A CORDLESS FACSIMILE SYSTEM

CLAIM OF PRIORITY

This application makes reference to, incorporates the same herein, and claims all benefits accruing under 35 U.S.C. §119 from an application for METHOD OF RECORDING TELEPHONE CONVERSATION IN CORDLESS FACSIMILE SYSTEM earlier filed in the Korean Industrial Property Office on Jun. 19, 1997 and there duly assigned Ser. No. 25694/1997.

BACKGROUND OF THE INVENTION

1. Field of the Invention

The present invention relates to a cordless facsimile system, and in particular, to a method of recording a telephone conversation in the cordless facsimile system.

2. Description of the Related Art

A common telephone with an automatic telephone answering function can record a telephone conversation. However, an existing facsimile apparatus cannot record the telephone conversation. Therefore, there has been a demand for a facsimile apparatus capable of recording the telephone conversation. Furthermore, a recently developed cordless facsimile system also requires such a telephone conversation recording function.

U.S. Pat. No. 4,788,714 to Hashimoto entitled Remote Controlling Telephone Unit for Selectively Activating One of a Plurality of Devices discloses a remote control unit that controls at least one additional device such as a facsimile system through a telephone answering device. It is disclosed that the telephone answering device is engaged with telephone lines upon reception of a ringing signal, and an outgoing message and an instruction message are sent out. It is disclosed that a calling party can record an incoming message in a recorder in a telephone answering device if desired. It is further disclosed when calling party wishes to drive an additional device, a remote control signal corresponding to the desired additional device is sent in accordance with the instruction message.

U.S. Pat. No. 4,922,524 to Baba et al. entitled Facsimile System with a Voice Transmission Function disclose a facsimile communication method including a voice relay mode. It is disclosed that when the voice relay mode have been established, image information is first transmitted from a transmitter to a receiver and then a voice message arbitrarily created by an operator of the transmitter is also transmitted from the transmitter to the receiver, together with a telephone number of an addressee of the image information.

U.S. Pat. No. 5,200,830 to Imaizumi et al. entitled Facsimile Apparatus Capable of Receiving and Printing Multiple Kinds of Data in Accordance with a Predetermined Priority Order disclose a facsimile apparatus that has a first operating mode in which first data entered through an interface from an external unit is received in precedence over second data entered through a modem from other facsimile apparatus over a communication line, and a second operating mode in which the second data is received in precedence over the first data, and is operative to receive and print data in accordance with the mode of priority order set on a switch. It is disclosed that the apparatus is provided with the two sheet delivery ports so that print paper on which the first data is printed and print paper on which the second data is printed are delivered separately to the respective delivery ports. A printing means is disclosed which incorporates a sheet feed means, with print data being disclosed as being supplied by a controller.

U.S. Pat. No. 5,200,991 to Motoyanagi entitled Image Communication System Including a Mobile Telephone Set and a Facsimile Device, disclose an image communication apparatus in which a mobile telephone set of a cordless telephone device is connected with a facsimile device through a connector and in which the connection of a telephone line of the mobile telephone set with a communication unit of the facsimile device is controlled on the basis of the state of the connection and the state of a telephone line for facsimile communication. A connection cord for the facsimile device is disclosed as not being required to enable free movements of an operator and the devices.

U.S. Pat. No. 5,255,312 to Koshiishi entitled Facsimile Machine Connectable to Various Communication Equipments discloses a facsimile machine which is coupled to a telephone line and a telephone set, where the facsimile machine connects the telephone set to the telephone line in a telephone mode and disconnects the telephone set from the telephone line in a facsimile mode so as to use the telephone line as a communication line for a facsimile communication, and the facsimile machine is connectable to a communication equipment via an interface unit which is designed exclusively for the communication equipment.

U.S. Pat. No. 5,282,238 to Berland entitled Facsimile Radio Communication System discloses a communication system which enables conventional telephone-type facsimile apparatus to communicate over a conventional two-way voice radio communication system. The system is disclosed as including an interface unit which is connected to the facsimile apparatus and to the transceiver apparatus of the radio communication system. It is disclosed that the interface unit transmits and receives information over the radio system in the form of a series of data packets, each containing origin address, destination address, send sequence and check digit information. A telephone line interface is disclosed that connects to a demodulator, converting received audible tones into digital data, with the information being sent to a thermal printer which reproduces the image of the original document transmitted from a compatible facsimile transceiver.

U.S. Pat. No. 5,299,024 to Kafri entitled Method and Apparatus for Broadcasting and Receiving Broadcasted Information discloses a system for broadcasting and receiving broadcasted information, wherein a first fax or modem is connected through a transmitter interface to a radio transmitter and a second fax or modem is connected through a receiver interface to a radio receiver. It is disclosed that information to be broadcast is encoded by the first fax or modem, transmitted through the transmitter interface and broadcasted. One or more receivers it is disclosed capture the broadcasted information and transmit the captured information through their respective receiver interfaces to their respective second fax machines where the information is decoded and recorded.

U.S. Pat. No. 5,426,511 to Nagamoto entitled Facsimile System with Base Unit Connected to Wire Network and in Communication with Multiple Extensions Sets by Wire or Radio Transmission discloses a facsimile system which includes a base station connected to a wire network, and a plurality of extension sets connected to the base station through radio networks. The base station includes a network control unit for receiving an image signal received through the wire network, a printer for outputting an image corresponding to the image signal received by the network control unit, a control circuit for calling an extension set in response to a call signal received through the wire network, a switching circuit for connecting the wire network to the network control unit in response to a response signal transmitted from the called extension set, and a transceiver for receiving the image signal transmitted from the extension set and sending the image signal to the wire network. It is disclosed the extension set included an image sensor for scanning a document, a transceiver for transmitting the image signal output from the image sensor to the base station, an operation section for manually designating the start of facsimile reception, and an extension set control circuit for sending out the response signal to the base station when the start of facsimile reception is instructed.

U.S. Pat. No. 5,479,485 to Hayashi entitled Facsimile Apparatus Comprising Cordless Telephone Set discloses a facsimile apparatus incorporating a cordless telephone function including a base unit for receiving and transmitting a signal to and from a remote unit via a radio signal, and a facsimile communication device.

U.S. Pat. No. 5,519,763 to Namekawa et al. entitled Communication Apparatus with Wireless Intercommunication disclose a communication apparatus coupled to a telephone line including a base having a telephone portion, a fax portion including a fax modem, a first switch for switching the mode between fax and telephone, and a first wireless communication portion, and at least a cordless unit having a second wireless communication portion for communicating with the base, and a second fax portion including a recording/reading portion. A cordless phone it is disclosed can be further provided. It is disclosed that a cordless unit has a guidance portion for outputting a given message and if there is an extension call to another cordless unit in a fax mode, the other cordless unit transmits a control signal and the cordless unit outputs the message. It is disclosed that the wireless communication portion has multi-channels to provide a communication between cordless units even when a cordless unit receives a fax signal.

U.S. Pat. No. 5,608,545 to Kagawa entitled Facsimile Device and Communication Control Method Thereof discloses a facsimile device, which can be used with a portable telephone working on a built-in battery, having a voltage detecting section for detecting voltage of a battery of the portable telephone and a control section providing controls to inhibit facsimile communication depending on the voltage detected by the voltage detecting section when facsimile communication is executed with the portable telephone.

U.S. Pat. No. 5,699,171 to Minamizawa et al. entitled Facsimile Machine Having a Plurality of Own-Call-Numbers disclose a facsimile machine including a data obtaining device which obtains a plurality of sets of own-call-number data each set of which identifies a corresponding one of a plurality of different own call numbers allotted to the facsimile machine according to a common numbering rule, each of the different own call numbers identifying the facsimile machine from other facsimile machines to which other call numbers different from the own call numbers are allotted according to the common numbering rule, a plurality of memories which are related with the different own call numbers, respectively, and in which a plurality of batches of information are stored, respectively, and a transmitter which transmits, to one of the other facsimile machines, the batch of information stored in one of the memories which corresponds to one of the different own call numbers identified by one of the sets of own-call-number data obtained by the data obtaining device. Another facsimile machine is disclosed including, in addition to the data obtaining device, a plurality of memories related with the different own call numbers, respectively, and a receiver which receives a batch of image information from one of the other facsimile machines and stores a received batch of image information in one of the memories which corresponds to one own call number identified by one set of own-call-number data obtained by the data obtaining device.

U.S. Pat. No. 5,748,337 to Minamizawa entitled Facsimile Device Having a Printing Function discloses a facsimile device having a printer function, the facsimile device capable of receiving data from another facsimile device and from a data processing device. The facsimile device is disclosed as including a device for setting a priority operating mode, the priority operating mode setting one of a print priority mode and a facsimile priority mode, and a device for setting at least one time out period.

SUMMARY OF THE INVENTION

It is therefore an object of the present invention to provide a method of recording a telephone conversation in a cordless facsimile system.

To achieve the above object and other objects of the present invention, there is provided a method of recording a telephone conversation in a cordless facsimile system including a cordless facsimile apparatus, a portable unit being wirelessly connected to the cordless facsimile apparatus, and a base unit connected to a public switched telephone network, for wirelessly connecting the cordless facsimile apparatus to the portable unit. The portable unit wirelessly transfers a telephone conversation recording command to the wireless facsimile apparatus according to the telephone conversation recording command input by a user of the portable unit. Upon receiving the telephone conversation recording command, the cordless facsimile apparatus receives an RF signal corresponding to the telephone conversation, being transferred between the portable unit and the base unit, converts the received RF signal to a voice signal, converts the voice signal to voice data, and stores the voice data in a memory.

Also, in the method of the present invention, to retrieve the recorded telephone conversation, the portable unit transfers a telephone conversation playback command to the cordless facsimile apparatus according to the telephone conversation playback command input by the user of the portable unit. Upon receiving the telephone conversation playback command transferred from the portable unit, the cordless facsimile apparatus reads the voice data stored in the memory, converts the read voice data to a voice signal, converts the voice signal to an RF signal, and transfers the RF signal to the portable unit. Then, the portable unit receives the RF signal transferred from the cordless facsimile apparatus and converts the received RF signal to the voice signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will be described in detail hereinbelow with reference to the accompanying drawings. In the following description, numerous specific details are set forth to provide a more thorough understanding of the present invention.

Figure 1:
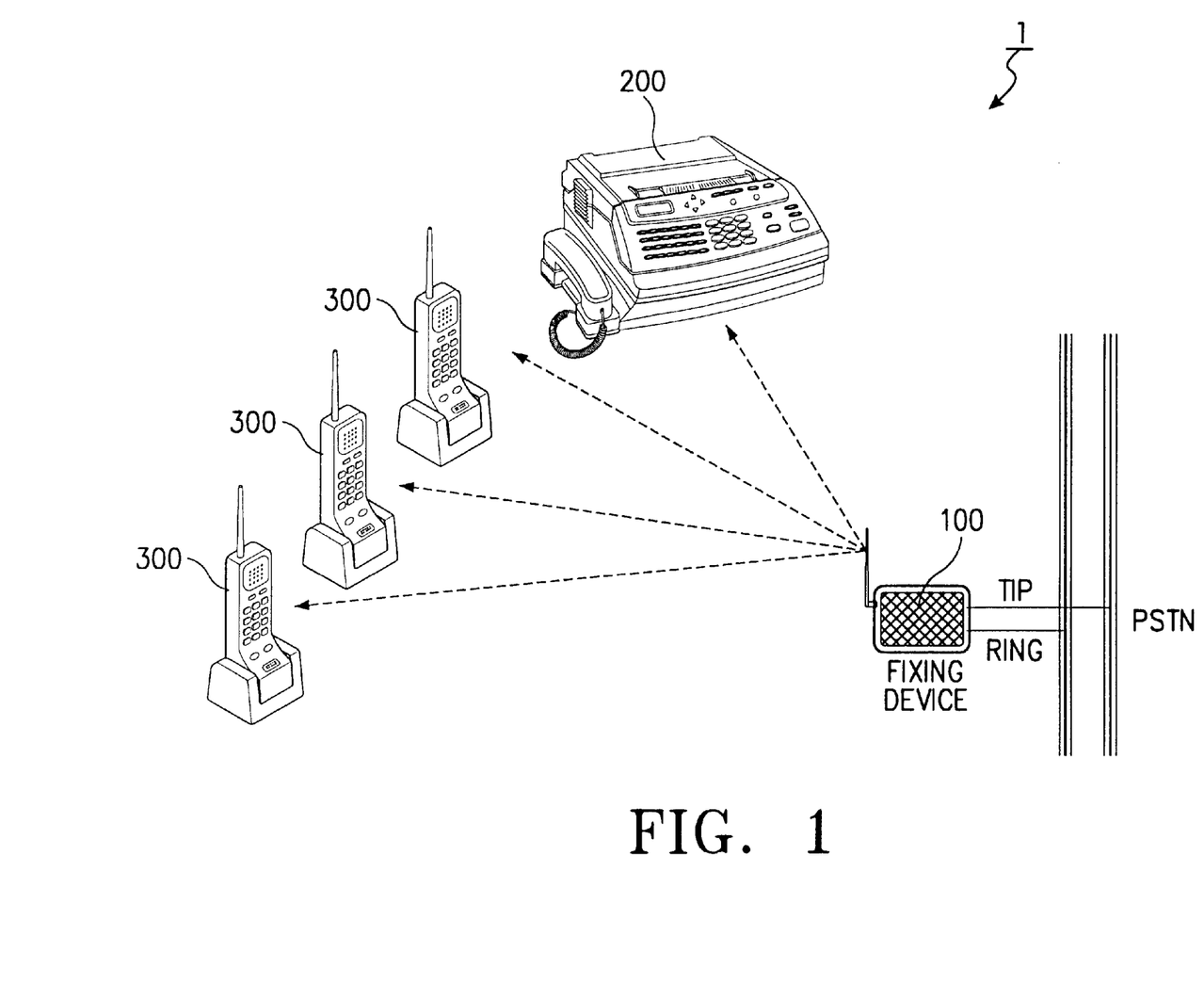
FIG. 1 is a diagram illustrating a cordless facsimile system connected to a public switched telephone network, to which the present invention is applicable.

Referring to FIG. 1, a cordless (or wireless signal transmission/receipt) facsimile system 1 to which the present invention is applicable, is wirelessly connected to a public switched telephone network (hereinafter referred to as PSTN). A tip line and a ring line of the PSTN are connected to a base unit 100 of the cordless facsimile system 1. The base unit 100 wirelessly provides a signal received from the PSTN to a cordless facsimile apparatus 200 and to at least one or a plurality of portable units 300 of the cordless facsimile system 1. The cordless facsimile apparatus 200 of cordless facsimile system 1 is connected to the PSTN and the portable units 300 via the base unit 100. The portable units 300 for the telephone conversation are wirelessly connected to one another via the base unit 100 and are also connected to the cordless facsimile apparatus 200 wirelessly.

Figure 2:
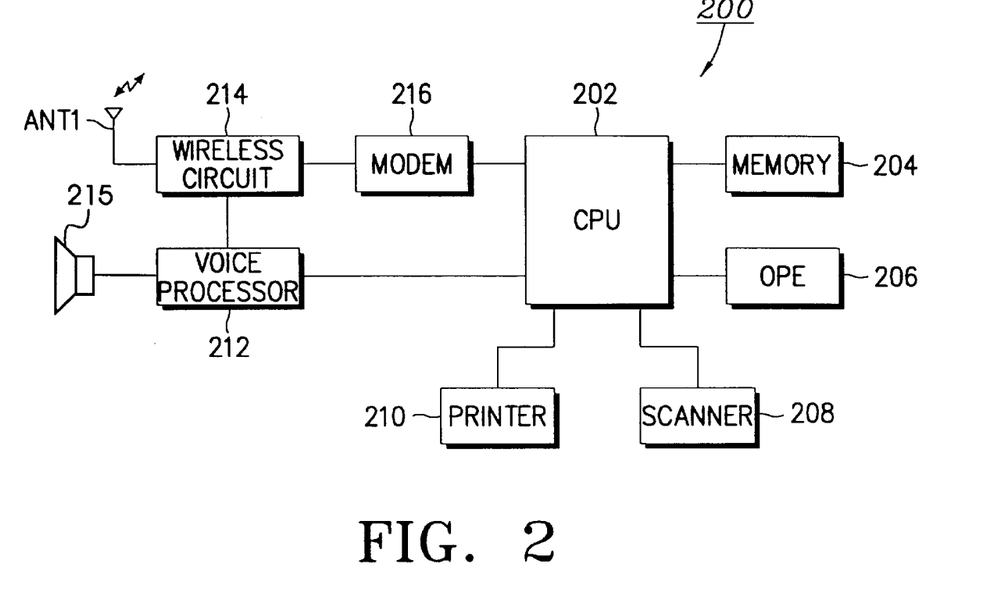
FIG. 2 is a block diagram of a cordless facsimile apparatus (200) of FIG. 1.

FIG. 2 illustrates a block diagram of the cordless facsimile apparatus 200. With reference to FIG. 2, a central processing unit (CPU) 202 controls an overall operation of the cordless facsimile apparatus 200 according to a control program stored in a memory 204. The memory 204 has a ROM (Read Only Memory) for storing the control program of the CPU 202 and a RAM (Random Access Memory) for temporarily storing data generated in the course of executing the control program of the CPU 202. An operating panel equipment (OPE) 206 includes a number of keys with which the user can input various commands, and a display for displaying an operating status of the cordless facsimile apparatus 200 under the control of the CPU 202. A scanner 208 scans a document and a printer 210 prints on a recording paper an image, under the control of the CPU 202. A radio circuit or wireless circuit 214 converts (demodulates) an RF (Radio Frequency) signal input from an antenna ANT1 into an analog signal, or converts (modulates) the analog signal into the RF signal to transfer it to the outside via the antenna ANT1. A MODEM (Modulator-Demodulator) 216 modulates an analog signal input from the radio circuit 214 into digital data to provide it to the CPU 202, and demodulates the digital data output from the CPU 202 into the analog signal to provide it to the radio circuit 214. The voice processor 212 converts a voice signal input from the radio circuit 214 into digital voice data to store it in the memory 204 or converts the voice data stored in the memory 204 into the voice signal to provide it to the radio circuit 214, under the control of the CPU 202.

Figure 3:
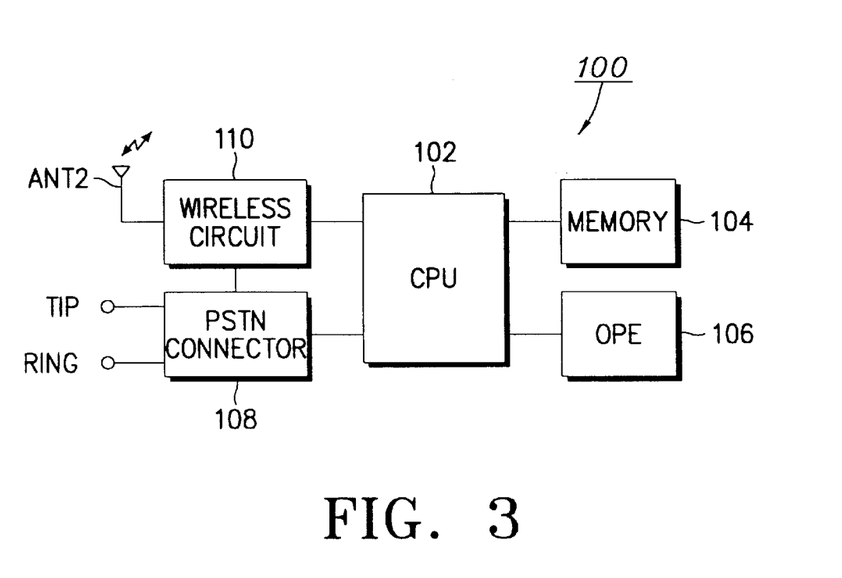
FIG. 3 is a block diagram of a base unit (100) of FIG. 1.

FIG. 3 illustrates a block diagram of the base unit 100, in which a CPU 102 controls an overall operation of the base unit 100 according to a control program stored in a memory 104. The memory 104 includes a ROM for storing a control program of the CPU 102 and a RAM for temporarily storing data generated in the course of executing the control program of the CPU 102. An OPE 106 has a number of keys with which the user can input various commands, and a display for displaying thereon an operating status of base unit 100 under the control of the CPU 102. A PSTN connector 108 connected to a tip terminal and a ring terminal of the PSTN, includes a ring signal detector (not shown) and a dialer (not shown). A radio circuit or wireless circuit 110 converts (demodulates) an RF signal input from an antenna ANT2 into an analog signal, or converts (modulates) a signal input from the PSTN into the RF signal to transfer it to the outside via the antenna ANT2.

Figure 4:
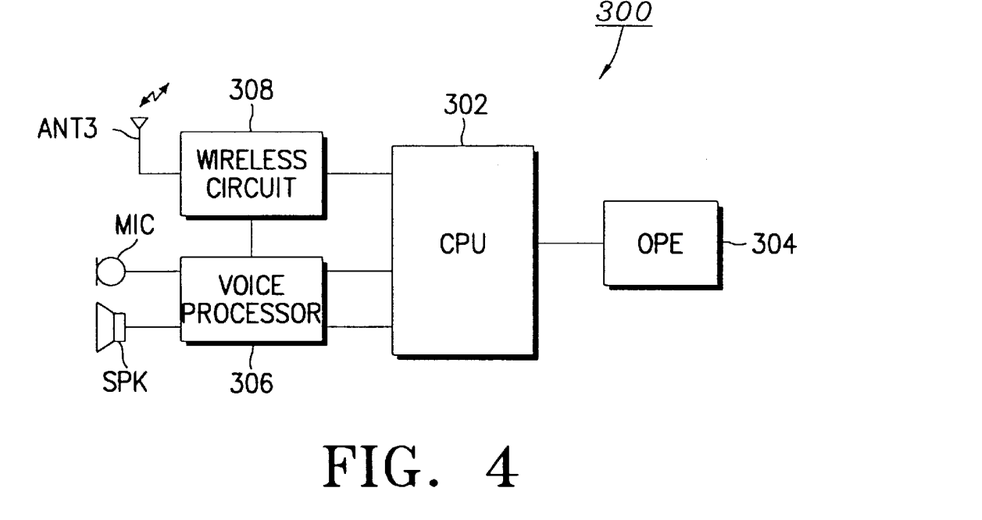
FIG. 4 is a block diagram of a portable unit (300) of FIG. 1.

FIG. 4 shows a block diagram of the portable unit 300, in which a CPU 302 controls an overall operation of the portable unit 300 according to a control program stored therein. An OPE 304 has a plurality of keys with which the user can input various commands, and a display for displaying thereon an operating status of the portable unit 300 under the control of the CPU 302. A radio circuit or wireless circuit 308 converts an RF signal input from an antenna ANT3 into an analog signal, and converts the analog signal output from a voice processor 306 into an RF signal to transfer it to the outside via the antenna ANT3. The voice processor 306 processes the voice signal input from a microphone MIC and outputs the processed voice signal using a speaker SPK.

Figure 5:
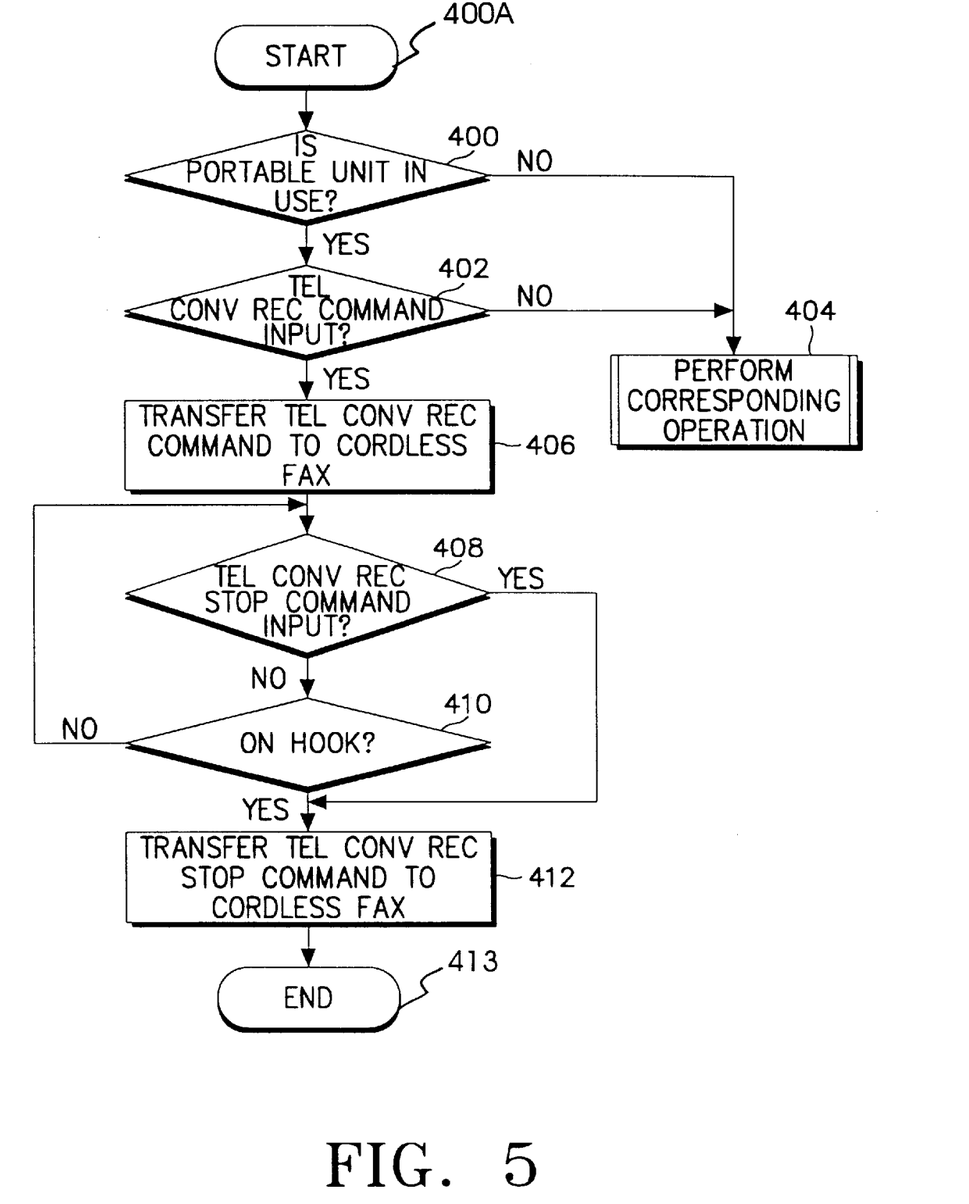
FIGS. 5 through 9 are flow charts for recording a telephone conversation in a cordless facsimile system according to preferred embodiments of the present invention.

Referring to FIGS. 5–9 and also to FIGS. 1–4, preferred embodiments of the method of the present invention applied to the cordless facsimile system described heretofore will be described in detail. First, a flow chart of the portable unit 300 is illustrated in FIG. 5, in case a user of the portable unit 300 desires to record the telephone conversation. Referring to FIG. 5, the method starts at step 400A. The method proceeds to step 400 where the CPU 302 of the portable unit 300 checks whether the user talks over the telephone using the portable unit 300. If the user talks over the telephone using the portable unit 300, the CPU 302 proceeds the method to step 402 and, if not, the CPU 302 proceeds the method to step 404 to perform a corresponding operation (i.e., perform an operation which was being performed previously). At step 402, the CPU 302 checks whether the user has input a telephone conversation recording command using the OPE 304. If so, the CPU 302 proceeds the method to step 406 and, if not, the CPU 302 proceeds the method to step 404. At step 406, the CPU 302 transfers the telephone conversation recording command to the cordless facsimile apparatus 200 via the radio circuit 308 and the antenna ANT3. After transmission of the telephone conversation recording command, the CPU 302 continues to perform the call service to enable the user to talk over the telephone continuously. While performing the call service, the method proceeds to step 408 where the CPU 302 judges whether the user has input a telephone conversation recording stop command using the OPE 304. If the user has input the telephone conversation recording stop command, the CPU 302 proceeds the method to step 412 and, if not, the CPU 302 proceeds the method to step 410 to check whether the user has completed the telephone conversation by on-hooking the handset. If the handset is on-hook, the CPU 302 proceeds the method to step 412 and, if not, the method returns the step 408 and the CPU 302 continues to perform the call service so as to enable the user to talk over the telephone continuously. If the user has input the telephone conversation recording stop command or if the handset is on-hook, the CPU 302 transfers at step 412 the telephone conversation recording stop command to the cordless facsimile apparatus 200 via the radio circuit 308 and the antenna ANT3 and then, the CPU 302 proceeds the method to step 413 to complete the procedure.

Figure 6:
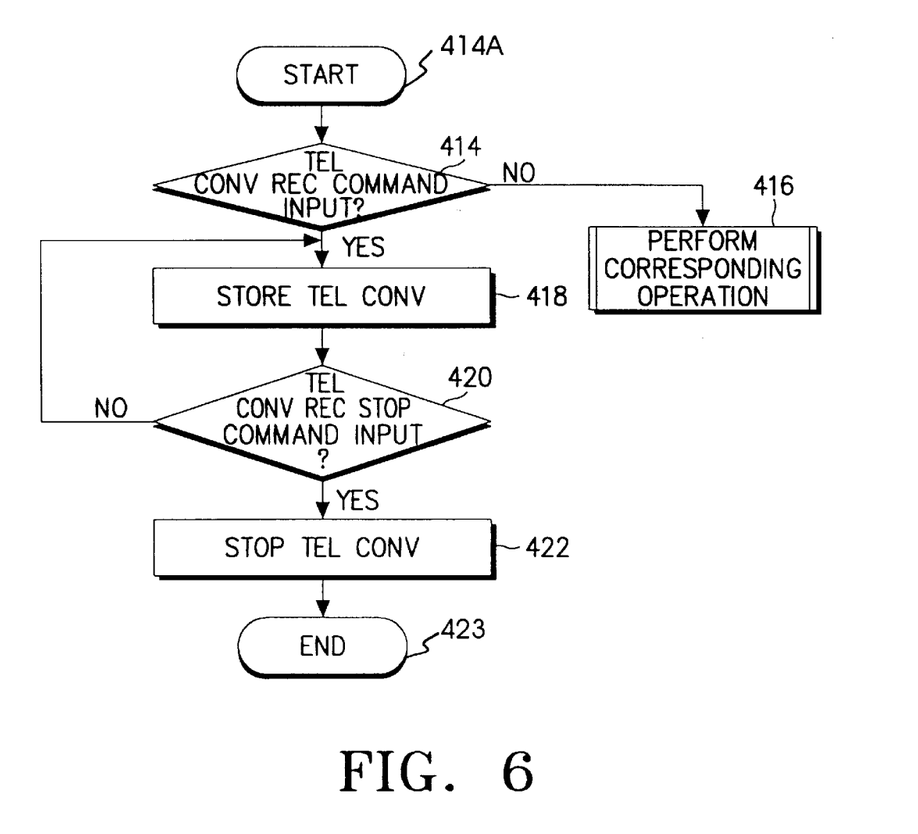

FIG. 6 illustrates a flow chart of the cordless facsimile apparatus 200, for recording the telephone conversation in response to the telephone conversation recording command and the telephone conversation recording stop command transferred from the portable unit 300. With reference to FIG. 6, the method starts at step 414A. The method proceeds to step 414 where the CPU 202 of the cordless facsimile apparatus 200 checks whether the telephone conversation recording command is received through the antenna ANT1. If the telephone conversation recording command is received, the CPU 202 proceeds the method to step 418 and, if not, the CPU 202 proceeds the method to step 416 to perform a corresponding operation. At the step 418, the CPU 202 records the telephone conversation in response to the telephone conversation recording command. Specifically describing the telephone conversation recording procedure, the cordless facsimile apparatus 200 receives the RF voice signal, via the antenna ANT1 thereof, being transferred between the portable unit 300 and the base unit 100. The received RF voice signal is converted into the analog voice signal by the radio circuit 214. Then, the analog voice signal is converted into the digital voice data by the voice processor 212 and stored in the memory 204, under the control of the CPU 202.

While recording the telephone conversation, the method proceeds to step 420 where the CPU 202 checks whether the telephone conversation recording stop command is received through the antenna ANT1. If the telephone conversation recording stop command is received, the CPU 202 proceeds the method to step 422 to stop recording the telephone conversation and the method proceeds to step 423 to end and, if not, the method returns to step 418 and the CPU 202 continues to record the telephone conversation.

As described, in the cordless telephone system according to the present invention, if the user of the portable unit 300 inputs the telephone conversation recording command during the telephone conversation, the portable unit 300 provides the cordless facsimile apparatus 200 with the telephone conversation recording command. Then, in response to the telephone conversation recording command, the cordless facsimile apparatus 200 receives the RF voice signal being transferred between the base unit 100 and the portable unit 300, and converts the received RF voice signal to the digital voice data to store it in the memory 204, so as to record the telephone conversation. While recording the telephone conversation, if the user of the portable unit 300 inputs the telephone conversation recording stop command or completes the telephone conversation by on-hooking the handset, the portable unit 300 provides the cordless facsimile apparatus 200 with the telephone conversation recording stop command. Then, the cordless facsimile apparatus 200 completes recording of the telephone conversation in response to the telephone conversation recording stop command.

Figure 7:
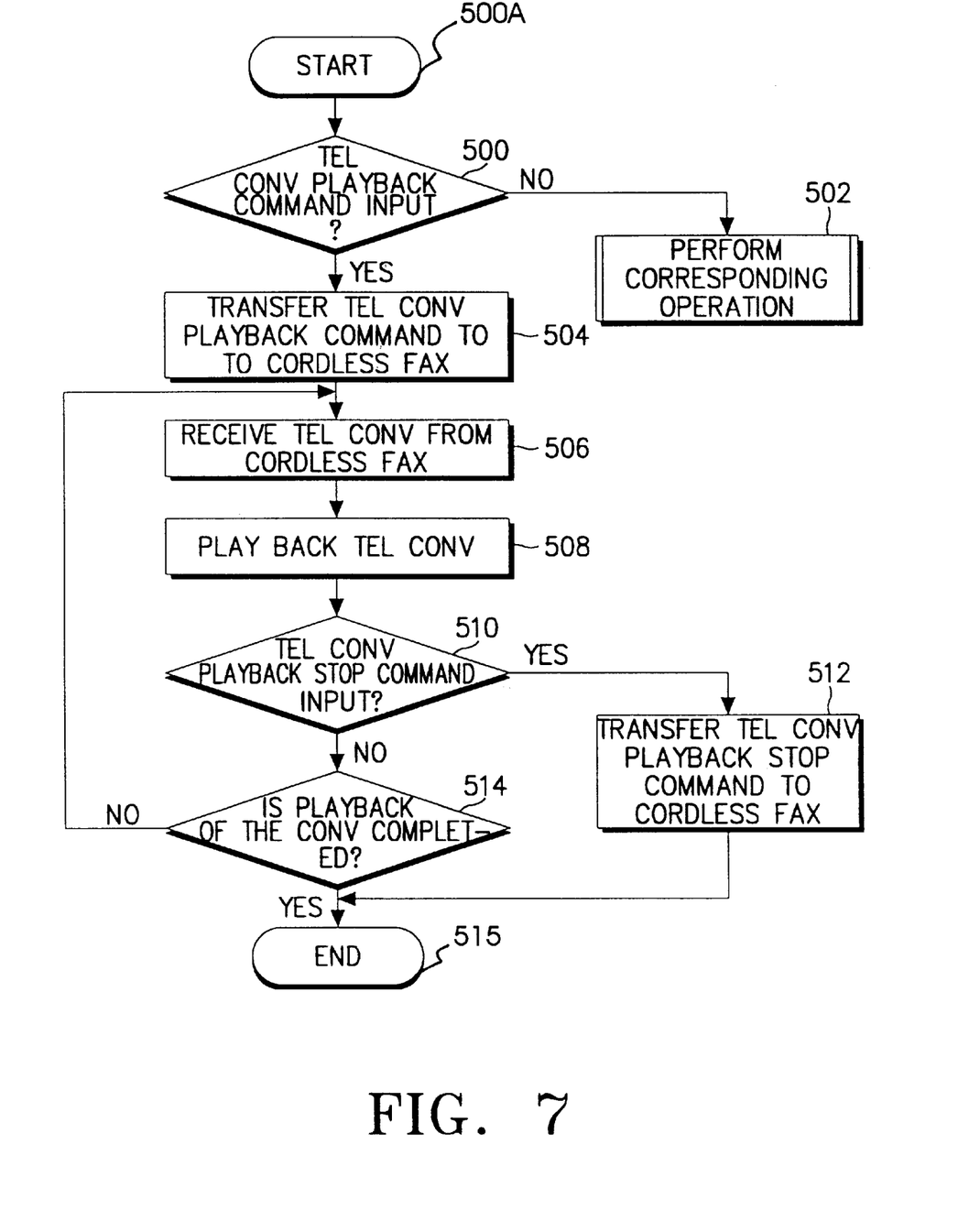

FIG. 7 illustrates a flow chart of the portable unit 300, for playing back the recorded telephone conversation. With reference to FIG. 7, the method starts at step 500A. The method proceeds to step 500 where the CPU 302 of the portable unit 300 checks whether the user has input a telephone conversation playback command using the OPE 304. If the user has input the telephone conversation playback command, the CPU 302 proceeds the method to step 504 and, if not, the CPU 302 proceeds the method to step 502 to perform a corresponding operation. At step 504, the CPU 302 transfers the telephone conversation playback command to the cordless facsimile apparatus 200. After transferring the telephone conversation playback command at step 504, the method proceeds to step 506 where the portable unit 300 receives the RF voice signal corresponding to the recorded telephone conversation from the cordless facsimile apparatus 200. The RF signal is demodulated into the voice signal by the radio circuit 308.

Upon receiving the RF signal, the method proceeds to step 508 where the voice processor 306 outputs the voice signal through the speaker SPK under the control of the CPU 302, to thereby play back the recorded telephone conversation. During playback of the recorded telephone conversation, the method proceeds to step 510 where the CPU 302 checks whether the user has input a telephone conversation playback stop command by using the OPE 304. If the user has input the telephone conversation playback stop command, the CPU 302 proceeds the method to step 512 and, if not, the CPU 302 proceeds the method to step 514. At step 512, the CPU 302 transfers the telephone conversation playback stop command to the cordless facsimile apparatus 200 and the method proceeds to step 515 to end. Meantime, at step 514, the CPU 302 checks whether a telephone conversation playback completion signal is received from the cordless facsimile apparatus 200. If the telephone conversation playback completion signal is received, the CPU 302 proceeds the method to step 515 and ends the procedure, judging that playback of the recorded telephone conversation is completed and, if not, the CPU 302 returns the method to step 506 if still receiving the recorded telephone conversation and continues to play back the recorded telephone conversation at step 508.

Figure 8:
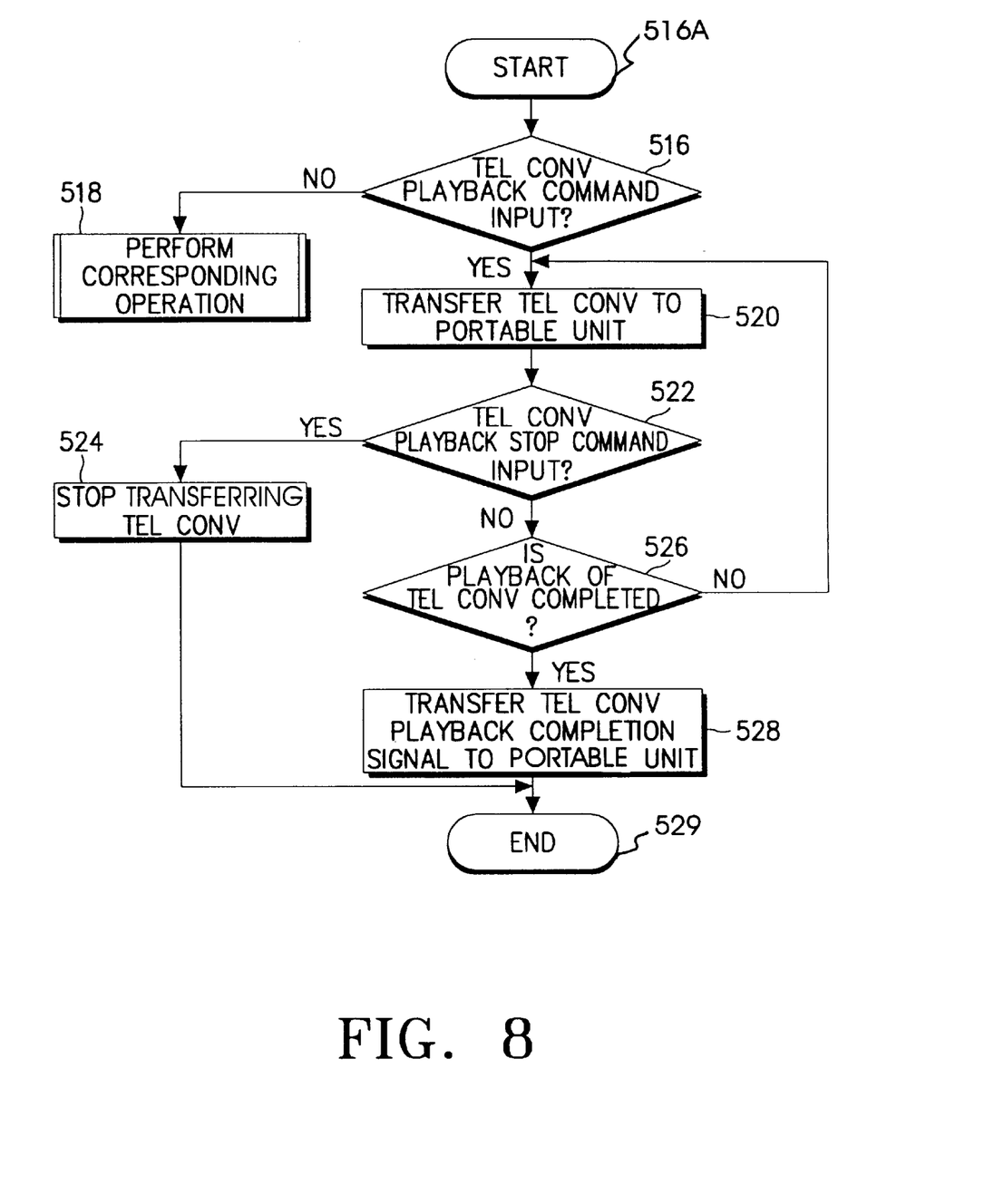

FIG. 8 illustrates a flow chart of the cordless facsimile apparatus 200, for transferring the telephone conversation stored in the memory 204 to the portable unit 300 in response to the telephone conversation playback command from the portable unit 300. With reference to FIG. 8, the method starts at step 516A. The method then proceeds to step 516 where the CPU 202 of the cordless facsimile apparatus 200 checks whether the telephone conversation playback command is received through the antenna ANT1. If the telephone conversation playback command is received, the CPU 202 proceeds the method to step 520 and, if not, the CPU 202 proceeds the method to step 518 to perform a corresponding operation. At step 520, the CPU 202 reads the voice data stored in the memory 204 and provides it to the voice processor 212. The voice processor 212 converts the voice data to the voice signal and provides it to the radio circuit 214, under the control of the CPU 202. The radio circuit 214 converts the voice signal to the RF signal and transfers it to the portable unit 300 via the antenna ANT I, under the control of the CPU 202.

During transfer of the RF signal to the portable unit 300, the method proceeds to step 522, where the CPU 202 checks whether the telephone conversation playback stop command is received through the antenna ANT1. If the telephone conversation playback stop command is received, the CPU 202 proceeds the method to step 524 to stop transferring the voice data corresponding to the telephone conversation and the method proceeds to step 529 to end; and, if not, the CPU 202 proceeds the method to step 526 to check whether the voice data corresponding to the telephone conversation, stored in the memory 204, are entirely read out and transferred to the portable unit 300. If the voice data are entirely read out and transferred to the portable unit 300, the CPU 202 proceeds the method to step 528, judging that playback of the recorded telephone conversation is completed and, if not, the CPU 202 returns the method to step 520 and continues to transfer the voice data corresponding to the telephone conversation to the portable unit 300. At the step 528, the CPU 202 transfers the telephone conversation playback completion signal to the portable unit 300; and the CPU 202 then proceeds the method to step 529 and ends the procedure.

As described above, the cordless facsimile apparatus 200 reads the voice data stored in the memory 204 in response to the telephone conversation playback command from the portable unit 300, and transfers the read voice data to the portable unit 300. Then, the portable unit 300 receives the voice data and plays it back.

Figure 9:
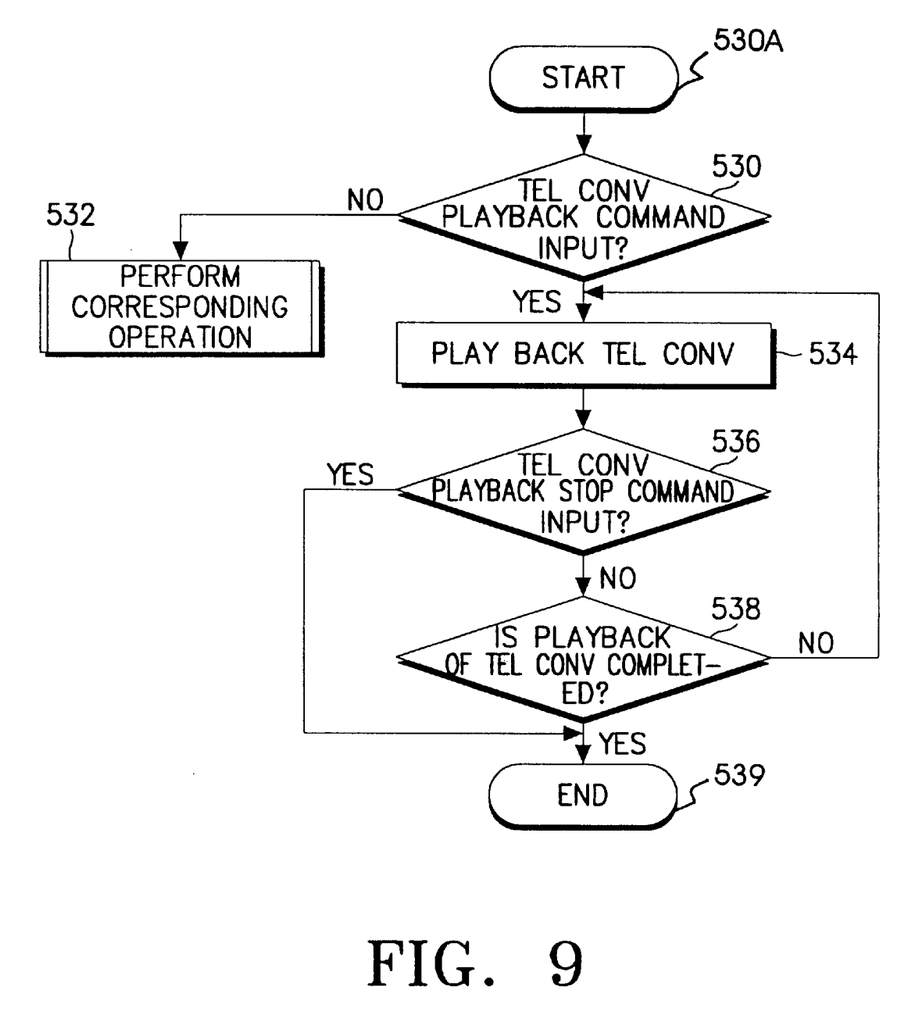

FIG. 9 illustrates a flow chart of the cordless facsimile apparatus 200, for playing back the voice data stored therein. Referring to FIG. 9, the method starts at step 530A. The method then proceeds to step 530 where the CPU 202 checks whether the user has input the telephone conversation playback command using the OPE 206. If the user has input the telephone conversation playback command, the CPU 202 proceeds the method to step 534 and, if not, the CPU 202 proceeds the method to step 532 to perform a corresponding operation. At step 534, the CPU 202 reads the voice data corresponding to the telephone conversation, stored in the memory 204, and provides the read voice data to the voice processor 212. The voice processor 212 converts the voice data to the voice signal, and provides it to a speaker 215. The speaker 215 outputs the voice corresponding to the voice signal. While playing back the telephone conversation, the method proceeds to step 536 where the CPU 202 checks whether the user has input the telephone conversation playback stop command by using the OPE 206. If the user has input the telephone conversation playback stop command, the CPU 202 ends the procedure and the method proceeds to end at step 539; and, if not, the CPU 202 proceeds the method to step 538 to check whether the voice data stored in the memory 204 is entirely read out and transferred to the voice processor 212. If so, the CPU 202 proceeds the method to step 539 and ends the procedure, judging that playback of the telephone conversation is completed and, if not, the CPU 202 returns the method to step 534 and continues to play back the telephone conversation. In this manner, the cordless facsimile apparatus 200 can play back the telephone conversation stored therein.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications can be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method of recording a telephone conversation in a cordless facsimile system, comprising the steps of:

providing a cordless facsimile system, the cordless facsimile system including a cordless facsimile apparatus, a portable unit for being wirelessly connected to the cordless facsimile apparatus, and a base unit for wirelessly connecting the cordless facsimile apparatus to the portable unit, the base unit for being connected to a public switched telephone network;

inputting by a user through the portable unit a telephone conversation recording command to record a telephone conversation received by the portable unit;

wirelessly transferring from the portable unit the telephone conversation recording command to the cordless facsimile apparatus;

receiving in the cordless facsimile apparatus the telephone conversation recording command from the portable unit;

receiving in the cordless facsimile apparatus a Radio Frequency signal being transferred between the portable unit and the base unit corresponding to the telephone conversation to be recorded;

converting the Radio Frequency signal corresponding to the telephone conversation to be recorded received by the cordless facsimile apparatus to a voice signal;

converting the voice signal in the cordless facsimile apparatus to voice data;

storing the voice data in a memory of the cordless facsimile apparatus;

generating by the portable unit a telephone conversation playback command input by the user of the portable unit; and transferring from the portable unit the telephone conversation playback command generated by the portable unit to the cordless facsimile apparatus.

2. The method as claimed in claim 1, further comprising the steps of:

receiving in the cordless facsimile apparatus the telephone conversation playback command;

reading by the cordless facsimile apparatus the voice data stored in the memory of the cordless facsimile apparatus corresponding to the telephone conversation that has been recorded;

converting the read voice data corresponding to the telephone conversation recorded to a voice signal;

converting the voice signal corresponding to the read voice data to a Radio Frequency signal corresponding to the telephone conversation recorded;

transferring the Radio Frequency signal corresponding to the telephone conversation recorded to the portable unit;

receiving in the portable unit the Radio Frequency signal corresponding to the telephone conversation recorded transferred from the cordless facsimile apparatus; and converting the received Radio Frequency signal corresponding to the telephone conversation recorded to a voice signal in the portable unit.

3. The method as claimed in claim 1, further comprising the steps of:

generating in the cordless facsimile apparatus a telephone conversation playback command input by a user of the cordless facsimile apparatus;

reading by the cordless facsimile apparatus the voice data stored in the memory of the cordless facsimile apparatus corresponding to the telephone conversation that has been recorded;

converting the read voice data corresponding to the telephone conversation recorded to a voice signal; and outputting the voice signal corresponding to the telephone conversation recorded that has been stored in the memory of the cordless facsimile apparatus.

4. A method of recording a telephone conversation, comprising the steps of:

providing a cordless facsimile system, the cordless facsimile system including a cordless facsimile apparatus, a portable unit for being wirelessly connected to the cordless facsimile apparatus, and a base unit for being connected to a public switched telephone network, the base unit for wirelessly connecting the cordless facsimile apparatus to the portable unit;

causing the portable unit to wirelessly transfer a telephone conversation recording command to the cordless facsimile apparatus according to the telephone conversation recording command input by a user of the portable unit;

causing the cordless facsimile apparatus to receive a Radio Frequency signal corresponding to the telephone conversation, being transferred between the portable unit and the base unit, upon receiving the telephone conversation recording command, to convert the received Radio Frequency signal to a voice signal, to convert the voice signal to voice data, and to store the voice data in a memory; and causing the portable unit to generate a telephone conversation playback command and to transfer the telephone conversation playback command generated by the portable unit to the cordless facsimile apparatus.

5. The method as claimed in claim 4, further comprising the steps of:

causing the portable unit to transfer the telephone conversation playback command to the cordless facsimile apparatus according to a telephone conversation playback command input by the user of the portable unit;

causing the cordless facsimile apparatus to read the voice data stored in the memory upon receiving the telephone conversation playback command transferred from the portable unit, to convert the read voice data to a voice signal, to convert the voice signal corresponding to the read voice data to a corresponding Radio Frequency signal, and to transfer the corresponding Radio Frequency signal to the portable unit; and causing the portable unit to receive the corresponding Radio Frequency signal transferred from the cordless facsimile apparatus, and to convert the received corresponding Radio Frequency signal to a voice signal.

6. The method as claimed in claim 4, further comprising the step of causing the cordless facsimile apparatus to read the voice data stored in the memory in response to a telephone conversation playback command input by a user of the cordless facsimile apparatus, to convert the read voice data to a corresponding voice signal, and to output the corresponding voice signal.

7. A cordless facsimile system, comprising:

a cordless facsimile apparatus for receiving a Radio Frequency signal corresponding to a telephone conversation to be recorded, for converting the received Radio Frequency signal to a voice signal, and for converting the voice signal to voice data, and for storing the voice data in a memory of the cordless facsimile apparatus;

a portable unit, the portable unit for being wirelessly connected to the cordless facsimile apparatus, the portable unit for generating and for wirelessly transferring a telephone conversation recording command to the cordless facsimile apparatus according to the telephone conversation recording command input by a user of the portable unit, and the portable unit is also for generating a telephone conversation playback command and for transferring the telephone conversation playback command generated by the portable unit to the cordless facsimile apparatus; and a base unit, the base unit for connecting to a public switched telephone network and for wirelessly connecting the cordless facsimile apparatus to the portable unit.

8. The cordless facsimile system as claimed in claim 7, further comprised of:

the portable unit is also for receiving a corresponding Radio Frequency signal transferred from the cordless facsimile apparatus corresponding to the telephone conversation stored in the memory of the cordless facsimile apparatus, and for converting the received corresponding Radio Frequency signal to a voice signal; and the cordless facsimile apparatus is also for reading the voice data stored in the memory of the cordless facsimile apparatus corresponding to the telephone conversation recorded, for converting the read voice data to a voice signal, for converting the voice signal corresponding to the read voice data to the corresponding Radio Frequency signal, and for transferring the corresponding Radio Frequency signal to the portable unit.

9. The cordless facsimile system as claimed in claim 7, further comprised of the telephone conversation playback command being input by the user of the portable unit.

10. The cordless facsimile system as claimed in claim 7, further comprised of the cordless facsimile apparatus is also for reading the voice data stored in the memory of the cordless facsimile apparatus corresponding to the telephone conversation recorded, for converting the read voice data to a corresponding voice signal, and for outputting the corresponding voice signal.

11. The cordless facsimile system as claimed in claim 10, further comprised of a telephone conversation playback command is input by a user of the cordless facsimile apparatus for reading the voice data stored in the memory of the cordless facsimile apparatus.

* * * * *